United States Patent
Sun

(10) Patent No.: US 10,203,727 B2
(45) Date of Patent: Feb. 12, 2019

(54) CURVATURE ADJUSTMENT DEVICE OF CURVED DISPLAY SCREEN, CURVATURE ADJUSTMENT METHOD FOR CURVED DISPLAY SCREEN, AND CURVED DISPLAY DEVICE

(71) Applicant: BOE Technology Group Co., Ltd., Beijing (CN)

(72) Inventor: Li Sun, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 15/537,496

(22) PCT Filed: Oct. 25, 2016

(86) PCT No.: PCT/CN2016/103230
§ 371 (c)(1),
(2) Date: Jun. 19, 2017

(87) PCT Pub. No.: WO2017/071556
PCT Pub. Date: May 4, 2017

(65) Prior Publication Data
US 2017/0344072 A1 Nov. 30, 2017

(30) Foreign Application Priority Data
Oct. 26, 2015 (CN) .......................... 2015 1 0703751

(51) Int. Cl.
*G06F 1/16* (2006.01)
*G02F 1/1333* (2006.01)
(Continued)

(52) U.S. Cl.
CPC ...... *G06F 1/1652* (2013.01); *G02F 1/133305* (2013.01); *G02F 1/133308* (2013.01);
(Continued)

(58) Field of Classification Search
CPC ...................................................... G06F 1/1652
(Continued)

(56) References Cited

U.S. PATENT DOCUMENTS 8,266,834 B2    9/2012 Chen et al.
9,500,856 B2 *  11/2016 Yoshikawa ........ G02B 26/0825
(Continued)

FOREIGN PATENT DOCUMENTS

CN        2444360 Y      8/2001
CN        103398275 A    11/2013
(Continued)

OTHER PUBLICATIONS

Jan. 18, 2017—(WO) International Search Report and Written Opinion Appn PCT/CN2016/103230 with English Translation.
(Continued)

*Primary Examiner* — Christopher E Mahoney
(74) *Attorney, Agent, or Firm* — Banner & Witcoff, Ltd.

(57) ABSTRACT

A curvature adjustment device of a curved display screen, a curvature adjustment method for a curved display screen and a curved display device. A curvature adjustment device for a curved surface display screen includes: a supporting back plate, which is a supporting plate having a fixed curvature; an elastic back plate, which is connected to the supporting back plate and capable of being elastically deformed to change a curvature; and an adjusting device, configured to adjust the curvature of the elastic back plate. The adjustment device is used to change the curvature of the elastic back plate, such that the display screen can be curved into different arc shapes, improving the applicability of the curvature adjustment device of the curved display screen.

10 Claims, 4 Drawing Sheets

(51) Int. Cl.
  *G03B 21/56* (2006.01)
  *G09F 9/30* (2006.01)
  *H05K 5/02* (2006.01)
(52) U.S. Cl.
  CPC .............. *G03B 21/56* (2013.01); *G09F 9/301* (2013.01); *H05K 5/02* (2013.01); *G02F 2001/133314* (2013.01); *G02F 2001/133322* (2013.01)
(58) Field of Classification Search
  USPC .......................................................... 359/451
  See application file for complete search history.

(56) References Cited

U.S. PATENT DOCUMENTS

| | | | | |
|---|---|---|---|---|
| 2012/0314315 | A1* | 12/2012 | Yoshimura | F24J 2/10 359/853 |
| 2013/0329422 | A1* | 12/2013 | Park | G02F 1/133305 362/233 |
| 2015/0192952 | A1 | 7/2015 | Jung et al. | |

FOREIGN PATENT DOCUMENTS

| | | |
|---|---|---|
| CN | 103941456 A | 7/2014 |
| CN | 103941457 A | 7/2014 |
| CN | 203770979 U | 8/2014 |
| CN | 104197240 A | 12/2014 |
| CN | 104266146 A | 1/2015 |
| CN | 104407461 A | 3/2015 |
| CN | 204516279 U | 7/2015 |
| CN | 105225614 A | 1/2016 |
| CN | 205211314 U | 5/2016 |
| JP | H1026754 A | 1/1998 |
| JP | 2006023676 A | 1/2006 |
| KR | 20140095840 A | 8/2014 |
| KR | 20150049822 A | 5/2015 |

OTHER PUBLICATIONS

Jun. 2, 2017—(CN) Office Action Appn 201510703751.4 with English Translation.
Nov. 1, 2017—(CN) Second Office Action Appn 201510703751.4 with English Tran.

* cited by examiner

CURVATURE ADJUSTMENT DEVICE OF CURVED DISPLAY SCREEN, CURVATURE ADJUSTMENT METHOD FOR CURVED DISPLAY SCREEN, AND CURVED DISPLAY DEVICE

The application is a U.S. National Phase Entry of International Application No. PCT/CN2016/103230 filed on Oct. 25, 2016, designating the United States of America and claiming priority to Chinese Patent Application No. 201510703751.4 filed on Oct. 26, 2015. The present application claims priority to and the benefit of the above-identified applications and the above-identified applications are incorporated by reference herein in their entirety.

TECHNICAL FIELD

Embodiments of the present disclosure relate to a curvature adjustment device for a curved surface display screen, a curvature adjustment method for a curved surface display screen and a curved surface display device.

BACKGROUND

In manufacture of a curved surface display screen, especially, in the manufacture of a large-sized curved surface display screen, the most common feasible method is that an external force is directly applied to both ends of a flat display panel, for example, the display panel is in a curved module framework structure, the external force of the module framework is used to offset the resilient force of the display panel, such that the display panel is kept in a curved form. As illustrated in FIG. 1, not only is a pre-curved supporting back plate 1 used to support a weight of the display panel, but also the resilient force generated by curving the display panel after the display panel and the supporting back plate 1 are assembled is offset by the pre-curved supporting back plate 1, and finally, the whole display panel 2 reaches a stable curve radius. Usually, the curved supporting back plate 1 is arc-shaped and is pre-curved to a smaller curvature. But, the arc shape, the pre-curving curvature, the thickness of the back plate and a density uniformity of a back plate material, etc., are fixed; and for the same display panel, the supporting back plates 1 of different curvatures are required for realizing the display screens 2 of different curvatures, which is unfavorable for reduction of a manufacturing cost and product management.

SUMMARY

According to an embodiment of the present disclosure, there is provided a curvature adjustment device for a curved surface display screen. The curvature adjustment device for a curved surface display screen comprises a supporting back plate, which is a supporting plate having a fixed curvature; an elastic back plate, which is connected to the supporting back plate and capable of being elastically deformed to change a curvature; and an adjusting device, configured to adjust the curvature of the elastic back plate.

For example, the elastic back plate is disposed on one surface of the supporting back plate facing the display screen, a center of the elastic back plate is fixedly connected to the supporting back plate, the adjusting device contains two adjusting parts, and the two adjusting parts are respectively disposed on both ends of the elastic back plate and are located between the elastic back plate and the supporting back plate.

For example, a fixing manner between the center of the elastic back plate and the supporting back plate is adhesive connection.

For example, the adjusting part is a telescopic device capable of being locked in a preset location, and the curvature of the elastic back plate is increased upon the telescopic device extending out.

For example, the telescopic device includes two spiral rods respectively movably connected to the elastic back plate and the supporting back plate, spiral directions of threads on the two spiral rods being opposite to each other; and a threaded sleeve which is located between the two spiral rods and is in spiral connection with the two spiral rods respectively; when the threaded sleeve rotates along a first direction, the two spiral rods are screwed out of the threaded sleeve, the telescopic device is in an extending state, the curvature of the elastic back plate is increased, and when the threaded sleeve rotates along a second direction, the two spiral rods are screwed into the threaded sleeve, the telescopic device is in a contracting state, and the curvature of the elastic back plate is reduced.

For example, the telescopic device includes: two supporting blocks movably connected to the elastic back plate and the supporting back plate respectively; two connecting rod groups, wherein each connecting rod group includes a first connecting rod and a second connecting rod movably connected to the first connecting rod, and the first connecting rod and the second connecting rod are movably connected to the two supporting blocks respectively, a connecting part between the first connecting rod and the second connecting rod is provided with a threaded hole, and thread rotation directions of the threaded holes of the two connecting rod groups are opposite to each other; and a spiral rod spirally connected to the threaded holes of the two connecting rod groups.

For example, the adjusting device includes: an assistant supporting back plate; and fixing posts, wherein both ends of the fixing posts are fixedly connected to the end part of the assistant supporting back plate and the end part of the elastic back plate, and a plurality of locking holes are disposed in length directions of the fixing posts. The assistant supporting back plate and the elastic back plate are respectively located on both sides of the supporting back plate, the supporting back plate is provided with a locating post matched with the locking hole, and when different locking holes are matched with the locating post, the curvature of the elastic back plate is changed.

For example, one surface of the assistant supporting back plate facing the elastic back plate is provided with a supporting post, and the supporting post penetrates through the supporting back plate to abut against the elastic back plate.

For example, the elastic back plate is provided with a dent structure matched with the supporting post.

According to an embodiment of the present disclosure, there is provided a curvature adjustment method for a curved surface display screen. The adjustment method uses the curvature adjustment device for a curved surface display screen mentioned above to adjust the curvature of the curved surface display screen. The method comprises: fixedly connecting the display screen with an elastic back plate; and adjusting the curvature of the elastic back plate by the adjusting device to bend the display screen fixed on the elastic back plate.

According to an embodiment of the present disclosure, there is provided a curved surface display device. The curved surface display device comprises the curvature adjustment device for a curved surface display screen mentioned above and a display screen, and the display screen is fixedly connected to the elastic back plate.

BRIEF DESCRIPTION OF THE DRAWINGS

In order to clearly illustrate the technical solution of the embodiments of the disclosure, the drawings of the embodiments will be briefly described in the following; it is obvious that the described drawings are only related to some embodiments of the disclosure and thus are not limitative of the disclosure.

DETAILED DESCRIPTION

In order to clarify the objects, technical solutions and advantages of the present disclosure, the technical solutions of embodiments of the present disclosure will be described in a clearly and fully understandable way in connection with the drawings. It is obvious that the described embodiments are just a part but not all of the embodiments of the disclosure. Based on the described embodiments of the present disclosure described, those ordinary skilled in the art can obtain all other embodiment(s), without any inventive work, which should be within the scope of the disclosure.

Embodiments of the present disclosure provide a curvature adjustment device for a curved surface display screen and a method thereof, and a curved surface display device. In the technical solutions of the embodiments of the present disclosure, the display screen is bent by an elastic back plate capable of being elastically deformed, such that the curvature adjustment device for a curved surface display screen can bend the display screen into different curvatures, and applicability of the curvature adjustment device for a curved surface display screen is improved. In order to conveniently understand the technical solutions of the embodiments of the present disclosure, the technical solutions of the embodiments of the present disclosure will be explained in detail in combination with the drawings.

Figure 1:
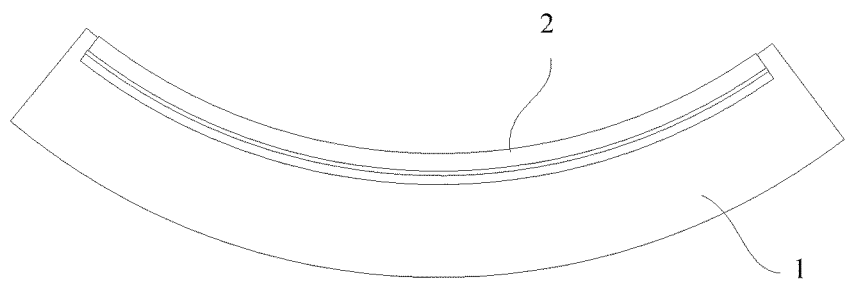
FIG. 1 is a structural schematic diagram of a curvature adjustment device for a curved surface display screen according to a technology.
Figure 2:
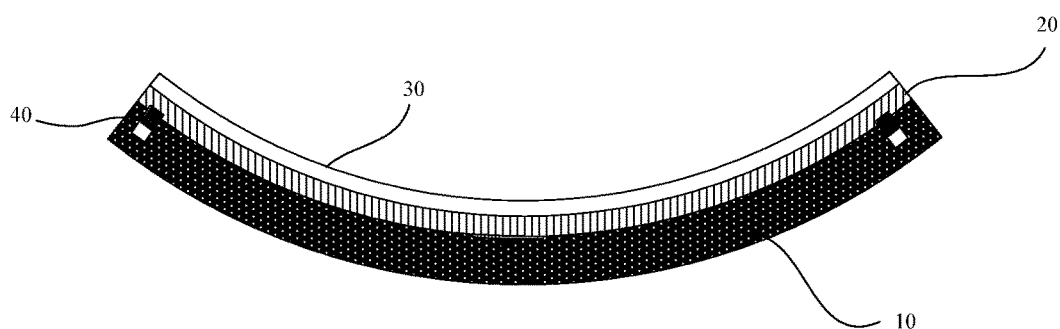
FIG. 2 is a state schematic diagram of a curvature adjustment device for a curved surface display screen provided by an embodiment of the present disclosure.

FIG. 2 illustrates a curvature adjustment device for a curved surface display screen provided by an embodiment of the present disclosure. As illustrated in FIG. 2, the embodiment of the present disclosure provides a curvature adjustment device for a curved surface display screen, which comprises: a supporting back plate 10, which is a supporting plate having a fixed curvature; an elastic back plate 20, which is connected to the supporting back plate 10 and capable of being elastically deformed to change a curvature; and an adjusting device, configured to adjust the curvature of the elastic back plate 20.

In an embodiment of the present disclosure, by adopting the adjusting device to adjust the curvature of the elastic back plate 20, the elastic back plate 20 can curve a display screen 30 into different curvatures, and the applicability of the curvature adjustment device for a curved surface display screen can be improved.

In an embodiment of the present disclosure, as illustrated in FIG. 2, the supporting back plate 10 is a base plate, the elastic back plate 20 can be elastically deformed to change a curvature of it, and the elastic back plate 20 is fixedly connected to the display screen 30. In the embodiments of the present disclosure, when the display screen 30 needs to be curved, firstly, the display screen 30 is fixed on the elastic back plate 20, and afterwards, by changing the curvature of the elastic back plate 20 through the adjusting device, the curving curvature of the display screen 30 can be changed.

The adjusting device can be realized by adopting various structures, and in order to conveniently understand the curvature adjustment device for a curved surface display screen provided by an embodiment of the present disclosure, the adjusting device is explained in detail hereinafter.

Figure 3:
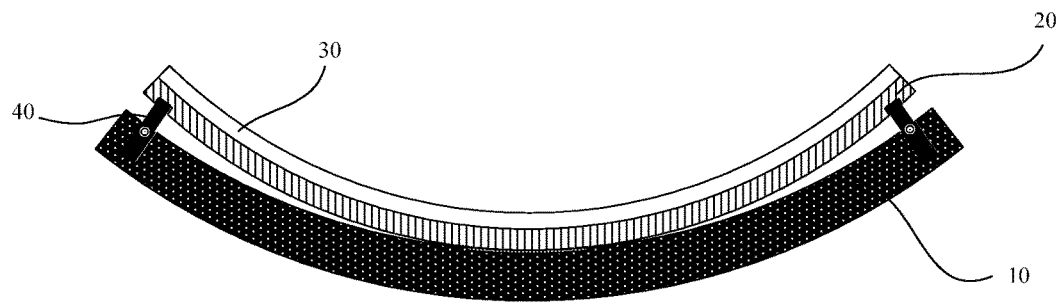
FIG. 3 is another state schematic diagram of the curvature adjustment device for a curved surface display screen provided by an embodiment of the present disclosure.
Figure 4:
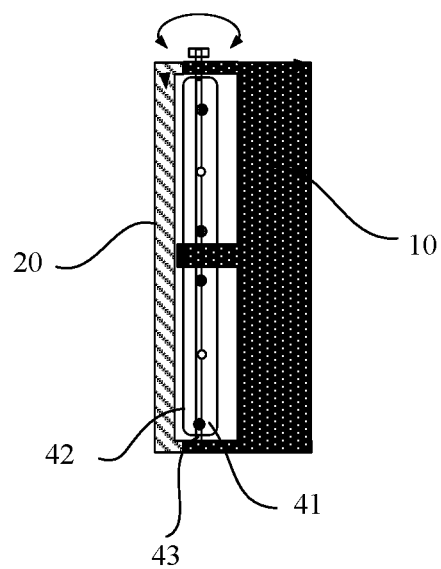
FIG. 4 is a state schematic diagram of an adjusting device provided by an embodiment of the present disclosure.
Figure 5:
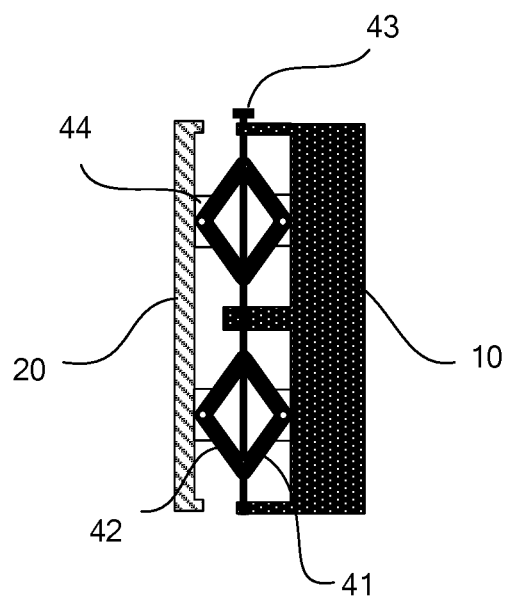
FIG. 5 is another state schematic diagram of the adjusting device provided by an embodiment of the present disclosure.

Reference is made to FIGS. 2 to 5, in which FIGS. 2 and 3 illustrate schematic diagrams when the curvature adjustment device for a curved surface display screen is in different working states in an embodiment of the present disclosure, and FIGS. 4 and 5 illustrate schematic diagrams when the adjusting device is in different working states provided by an embodiment of the present disclosure.

As illustrated in FIGS. 2 and 3, the display screen 30 is fixed on the elastic back plate 20, the supporting back plate 10 is disposed on one side of the elastic back plate 20 deviated from the display screen 30 (in other words, the elastic back plate 20 is disposed on one side of the supporting back plate 10 facing the display screen 30), a center of the elastic back plate 20 is fixedly connected to the supporting back plate 10, the adjusting device contains two adjusting parts 40, and the two adjusting parts 40 are respectively disposed on both ends of the elastic back plate 20 and are located between the elastic back plate 20 and the supporting back plate 10.

For example, various connecting manners, such as welding, fastener connecting or adhesion, can be adopted between the elastic back plate 20 and the supporting back plate 10. As an example, a fixing manner between the center of the elastic back plate 20 and the supporting back plate 10 is adhesive connection.

For example, the adjusting part 40 is a telescopic device capable of being locked in a set location, and the curvature of the elastic back plate is increased upon the telescopic device extending out. There are many types of such devices, such as a spiral mechanism, a rack mechanism, a driving cylinder, a driving hydraulic cylinder, etc.

In one embodiment, as illustrated in FIGS. 4 and 5, the telescopic device for example includes: two supporting blocks 44 movably connected (for example, hinged) to the elastic back plate 20 and the supporting back plate 10 respectively; two connecting rod groups, wherein each connecting rod group includes a first connecting rod 41 and a second connecting rod 42 movably connected (for example, hinged) to the first connecting rod 41, and the first connecting rod 41 and the second connecting rod 42 are movably connected (for example, hinged) to the two supporting blocks 44 respectively, a connecting part between the first connecting rod 41 and the second connecting rod 42 is provided with a threaded hole, and thread rotation directions of the threaded holes of the two connecting rod groups are opposite; and a spiral rod 43 spirally connected to the threaded holes of the two connecting rod groups. For example, the first connecting rod 41 and the second connecting rod 42 are hinged, and a hinge for hinging the first connecting rod 41 and the second connecting rod 42 and the spiral hole are crossed.

In the telescopic device as illustrated in FIGS. 4 and 5, the two connecting rod groups constitute a rhombus structure, and the shape of the rhombus structure is changed by spirals of the spiral rod 43, so as to change a distance from both ends of the elastic back plate 20 to the supporting back plate 10. The state of the telescopic device as illustrated in FIG. 4 is a state corresponding to FIG. 2, the elastic back plate 20 is clung to one surface of the supporting back plate 10 facing the display screen, and at this point, the elastic back plate 20 has a smaller curvature. When the elastic back plate 20 is required to be adjusted, the spiral rod 43 is rotated along a rotary direction as illustrated in FIG. 4 to finally form the state as illustrated in FIG. 5; at this point, the distance from both ends of the elastic back plate 20 to both ends of the supporting back plate 10 is increased, as illustrated in FIG. 3, both ends of the elastic plate 20 are pushed up by the telescopic device, the curvature of the elastic back plate 20 is increased, and further the curvature of the display screen 30 is increased.

Figure 6:
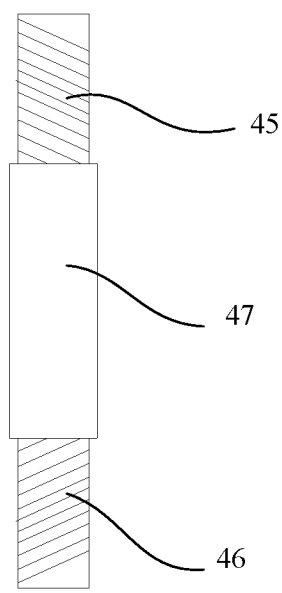
FIG. 6 is a state schematic diagram of another adjusting device provided by an embodiment of the present disclosure.

In one embodiment, as illustrated in FIG. 6, the telescopic device for example includes two spiral rods respectively movably connected (for example, hinged) to the elastic back plate 20 and the supporting back plate 10, spiral directions of threads on the two spiral rods being opposite; and a threaded sleeve 47 which is located between the two spiral rods and is in spiral connection with the two spiral rods respectively. For example, as illustrated in FIG. 6, the two spiral rods include a first spiral rod 45 and a second spiral rod 46, wherein one end of the first spiral rod 45 away from the threaded sleeve 47 is movably connected (for example, hinged) to the elastic back plate 20, and one end of the second spiral rod 46 away from the threaded sleeve 47 is movably connected (for example, hinged) to the supporting back plate 10. That is, a spiral mechanism is adopted as the telescopic device to adjust the curvature of the elastic back plate 20. Since thread rotation directions on the first spiral rod 45 and the second spiral rod 46 are opposite, when the threaded sleeve 47 rotates toward one direction, the first spiral rod 45 and the second spiral rod 46 are screwed in or out from the threaded sleeve 47 simultaneously. The central location of the elastic back plate 20 is fixedly connected to the supporting back plate 10, therefore, when the first spiral rod 45 and the second spiral rod 46 are screwed out from the threaded sleeve 47, the curvature of the elastic back plate 20 is increased, and when the first spiral rod 45 and the second spiral rod 46 are screwed in the threaded sleeve 47 at the same time, the curvature of the elastic back plate 20 is reduced. In this way, the elastic back plate 20 can be curved into different curvatures, and further the display screen 30 is bent into different curvatures.

Figure 7:
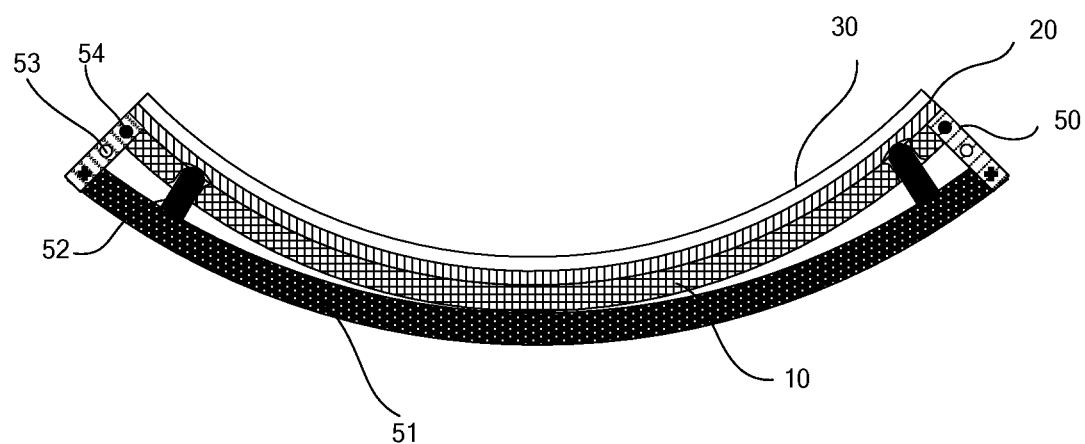
FIG. 7 is a state schematic diagram of another curvature adjustment device for a curved surface display screen provided by an embodiment of the present disclosure.
Figure 8:
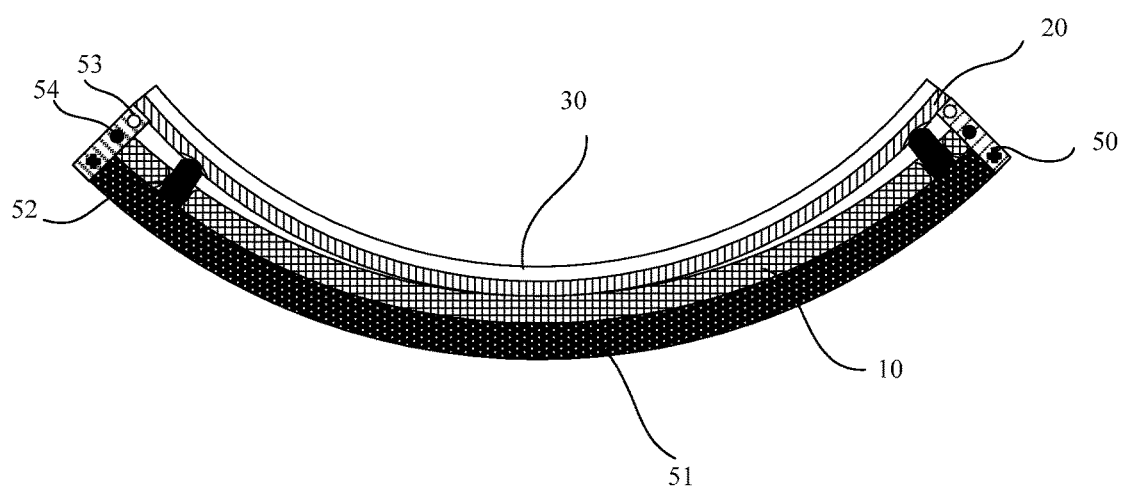
FIG. 8 is another state schematic diagram of another adjusting device for the curvature for a curved surface display screen provided by an embodiment of the present disclosure.

As illustrated in FIGS. 7 and 8, the adjusting device includes an assistant supporting back plate 51; and fixing posts 50, wherein both ends of the fixing posts 50 are fixedly connected to the end part of the assistant supporting back plate 51 and the end part of the elastic back plate 20, and a plurality of locking holes 53 are disposed in length directions of the fixing posts 50. The assistant supporting back plate 51 and the elastic back plate 20 are respectively located on both sides of the supporting back plate 10, the supporting back plate 10 is provided with a locating post 54 matched with the locking hole 53, and when different locking holes 53 are matched with the locating post 54, the curvature of the elastic back plate 20 is changed.

As illustrated in FIGS. 7 and 8, the assistant supporting back plate 51, the two fixing posts 50 and the elastic back plate 20 form a framework structure, and the supporting back plate 10 is disposed in the framework structure. For example, the assistant supporting back plate 51 and the elastic back plate 20 are both made of an elastic material, and therefore, both the assistant supporting back plate 51 and the elastic back plate 20 can be deformed. The plurality of locking holes 53 are disposed in the length directions of the fixing posts 50, the supporting back plate 10 is provided with the locating post 54 matched with the locking hole 53, and when the locating post 54 is clamped into the locking holes 53 in different locations, the elastic back plate 20 and the assistant supporting back plate 51 are deformed to different extents. FIGS. 7 and 8 illustrate different working states of the curvature adjustment device for a curved surface display screen when the locating post 54 is clamped into different locking holes 53. As illustrated in FIG. 7, the whole elastic back plate 20 is attached to one surface of the supporting back plate 10 facing the display screen. As illustrated in FIG. 8, when the location of the locating post 54 is changed, the curvature of the elastic back plate 20 is changed.

In order to ensure that the curvature is changed relatively uniformly when the curvature of the elastic back plate 20 is changed, for example, one surface of the assistant supporting back plate 51 facing the elastic back plate 20 is provided with a supporting post 52, and the supporting post 52 penetrates through the supporting back plate 10 to abut against the elastic back plate 20. As illustrated in FIG. 8, the supporting post 52 pushes against one side of the elastic back plate 20 facing the supporting back plate 10. Further, for example, the elastic back plate 20 is provided with an arc dent structure matched with the supporting post 52, and a match between the two is ensured.

It can be seen from the description above that different adjusting devices can be adopted as the curvature adjustment device for a curved surface display screen provided by the embodiment of the present disclosure as long as it can change the curvature of the elastic back plate 20 and can lock the elastic back plate 20 to an expected location, such that the display screen 30 is adjusted by the curvature adjustment device for a curved surface display screen to have different curvatures. It should be appreciated that the adjusting device provided by the embodiment of the present disclosure is not limited to the adjusting device provided by the embodiments mentioned above, and any other adjusting devices capable of realizing the functions mentioned above can be applied to the embodiment of the present disclosure.

An embodiment of the present disclosure further provides a curvature adjustment method for a curved surface display screen. The adjustment method uses the curvature adjustment device for a curved surface display screen mentioned above to adjust the curvature of the curved surface display screen. For example, the method comprises steps of: fixedly connecting the display screen with an elastic back plate; and adjusting the curvature of the elastic back plate by the adjusting device to bend the display screen fixed on the elastic back plate.

In an embodiment of the present disclosure, by adopting the adjusting device to adjust the curvature of the elastic back plate, the display screen can be curved by the elastic back plate into different curvatures, applicability of the curvature adjustment device for a curved surface display screen is improved, and the curvature of the display screen is convenient to adjust. It should be noted that when the curvature adjustment device for a curved surface display screen adopts different structures, a corresponding adjustment method is correspondingly changed, which is specifically referred to the description of FIGS. 4 to 8, and is not repeated herein.

An embodiment of the present disclosure further provides a curved surface display device, and the curved surface display device comprises the curvature adjustment device for a curved surface display screen mentioned above and a display screen, and the display screen is fixedly connected to the elastic back plate.

In an embodiment of the present disclosure, by adopting the adjusting device to adjust the curvature of the elastic back plate, the display screen can be curved by the elastic back plate into different curvatures, applicability of the curvature adjustment device for a curved surface display screen is improved, and the curved surface display device can realize different curvatures.

The foregoing embodiments merely are exemplary embodiments of the disclosure, and not intended to define the scope of the disclosure, and the scope of the disclosure is determined by the appended claims.

The application claims priority of Chinese Patent Application No. 201510703751.4 filed on Oct. 26, 2015, the disclosure of which is incorporated herein by reference in its entirety as part of the present application.

What is claimed is:

1. A curvature adjustment device for a curved surface display screen, comprising:
   a supporting back plate, which is a supporting plate having a fixed curvature;
   an elastic back plate, which is connected to the supporting back plate and capable of being elastically deformed to change a curvature; and
   an adjusting device, configured to adjust the curvature of the elastic back plate,
   wherein a fixing manner between the center of the elastic back plate and the supporting back plate is adhesive connection.

2. The curvature adjustment device for a curved surface display screen according to claim 1,
   wherein the elastic back plate is disposed on one surface of the supporting back plate facing the display screen, a center of the elastic back plate is fixedly connected to the supporting back plate, the adjusting device contains two adjusting parts, and the two adjusting parts are respectively disposed on both ends of the elastic back plate and are located between the elastic back plate and the supporting back plate.

3. The curvature adjustment device for a curved surface display screen according to claim 2,
   wherein each of the two adjusting parts is a telescopic device capable of being locked in a preset location, and the curvature of the elastic back plate is increased upon the telescopic device extending out.

4. The curvature adjustment device for a curved surface display screen according to claim 3, wherein the telescopic device includes:
   two spiral rods respectively movably connected to the elastic back plate and the supporting back plate, spiral directions of threads on the two spiral rods being opposite to each other; and
   a threaded sleeve which is located between the two spiral rods and is in spiral connection with the two spiral rods respectively; and
   when the threaded sleeve rotates along a first direction, the two spiral rods are screwed out of the threaded sleeve, the telescopic device is in an extending state, the curvature of the elastic back plate is increased; and when the threaded sleeve rotates along a second direction, the two spiral rods are screwed into the threaded sleeve, the telescopic device is in a contracting state, and the curvature of the elastic back plate is reduced.

5. A curvature adjustment method for a curved surface display screen, wherein the adjustment method uses the curvature adjustment device for a curved surface display screen according to claim 1 to adjust the curvature of the curved surface display screen, the method comprising:
   fixedly connecting the display screen with the elastic back plate; and
   adjusting the curvature of the elastic back plate by the adjusting device to bend the display screen fixed on the elastic back plate.

6. A curved surface display device, comprising the curvature adjustment device for a curved surface display screen according to claim 1 and a display screen, the display screen being fixedly connected to the elastic back plate.

7. A curvature adjustment device for a curved surface display screen, comprising:
   a supporting back plate, which is a supporting plate having a fixed curvature;
   an elastic back plate, which is connected to the supporting back plate and capable of being elastically deformed to change a curvature; and
   an adjusting device, configured to adjust the curvature of the elastic back plate;
   wherein the adjusting device contains two adjusting parts, each of the adjusting parts comprises a telescopic device capable of being locked in a preset location, and the telescopic device includes:
      two supporting blocks movably connected to the elastic back plate and the supporting back plate respectively;
      two connecting rod groups, wherein each connecting rod group includes a first connecting rod and a second connecting rod movably connected to the first connecting rod, and the first connecting rod and the second connecting rod are movably connected to the two supporting blocks respectively, a connecting part between the first connecting rod and the second connecting rod is provided with a threaded hole, and thread rotation directions of the threaded holes of the two connecting rod groups are opposite to each other; and
      a spiral rod spirally connected to threaded holes of the two connecting rod groups.

8. A curvature adjustment device for a curved surface display screen, comprising:
   a supporting back plate, which is a supporting plate having a fixed curvature;
   an elastic back plate, which is connected to the supporting back plate and capable of being elastically deformed to change a curvature; and
   an adjusting device, configured to adjust the curvature of the elastic back plate,
   wherein the adjusting device includes:
      an assistant supporting back plate; and
      fixing posts, wherein both ends of the fixing posts are fixedly connected to an end part of the assistant supporting back plate and an end part of the elastic back plate, and a plurality of locking holes are disposed in length directions of the fixing posts;

the assistant supporting back plate and the elastic back plate are respectively located on both sides of the supporting back plate, the supporting back plate is provided with a locating post matched with the locking hole, and when different locking holes are matched with the locating post, the curvature of the elastic back plate is changed.

9. The curvature adjustment device for a curved surface display screen according to claim 8, wherein one surface of the assistant supporting back plate facing the elastic back plate is provided with a supporting post, and the supporting post penetrates through the supporting back plate to abut against the elastic back plate.

10. The curvature adjustment device for a curved surface display screen according to claim 9, wherein the elastic back plate is provided with a dent structure matched with the supporting post.

\* \* \* \* \*